April 1, 1952 E. P. CARTER ET AL 2,591,406

PULSE GENERATING CIRCUITS

Filed Jan. 19, 1951 2 SHEETS--SHEET 1

INVENTORS
ELBERT P. CARTER AND
CLIFFORD M. HAMMEL
BY Robert J. Palmer
ATTORNEY

April 1, 1952 E. P. CARTER ET AL 2,591,406

PULSE GENERATING CIRCUITS

Filed Jan. 19, 1951 2 SHEETS--SHEET 2

INVENTORS
ELBERT P. CARTER AND
CLIFFORD M. HAMMEL
BY Robert J. Palmer
ATTORNEY

Patented Apr. 1, 1952 2,591,406

UNITED STATES PATENT OFFICE 2,591,406

PULSE GENERATING CIRCUITS

Elbert P. Carter, Wayland, and Clifford M. Hammel, Winchester, Mass., assignors to Transducer Corporation, Boston, Mass., a corporation of Delaware Application January 19, 1951, Serial No. 206,774

19 Claims. (Cl. 250—27)

This invention relates to pulse generating circuits, and has as an object to combine the pulse generating characteristics of blocking oscillators with the electronic switching action of conventional multivibrators, with a minimum of equipment.

In electronic computing systems, a shift register used for the storage of binary information, may require successive shifting pulses to be applied alternately to two different sets of shifting windings. These current pulses must be delivered at appreciable power levels, ranging from a few watts to the order of kilowatts, depending upon the number of stages in the register, the external loadings of the various magnetic binary elements, and the designs of the elements or the transformers. Pulse times ranging to 20 microseconds or larger are required. These requirements could be met with two conventional blocking oscillators, with the addition of a multivibrator or other such programming device to trigger the oscillators alternately at the desired times.

This invention combines the functions of blocking oscillators and multivibrators in simplified circuits including magnetic binary transformers. Such a transformer may consist of a toroidal core of nickel-iron alloy having the special properties of high residual induction (15,000 gauss), low coercive force (less than 0.1 oersted) and a saturation flux density very little higher than the maximum residual induction. Such a transformer becomes a binary element when excited by current pulses large enough to leave the core in either direction of maximum residual induction. Thus with respect to pulses of a given polarity, the core can have two states, an active state in which the core flux is opposite in direction to that induced by the pulses, and an inactive state in which the core flux and the induced flux directions are the same. In the active state, a pulse of the given polarity causes the core induction to change to the inactive state. A second such pulse causes no further change of state, although a minor increase of flux is induced, which amounts to the difference between the residual and the saturation inductions. A pulse of the opposite polarity will transfer the core to the active state with respect to the pulse of the given polarity.

A feature of this invention is that regeneratively coupled windings are used on a magnetic binary transformer core and are connected to an amplifier for providing with a small input pulse, a pulse having sufficient strength to saturate the core.

Another object of the invention is to provide pulse generating circuits including as components, magnetic binary transformers.

Another object of the invention is to provide a stepping pulse generator including as components, magnetic binary transformers.

The invention will now be described with reference to the drawing, of which:

The transformer cores referred to in the following are of the type described in the foregoing, and may consist of "Delta-Max" manufactured by the Allegheny Ludlum Steel Corporation. A detailed description of such core material, with its characteristics may be found in the article entitled "Static Magnetic Storage and Delay Line" by An Wong and Way Dong Woo published in volume 21 (January 1950) of the Journal of Applied Physics.

Figure 1:
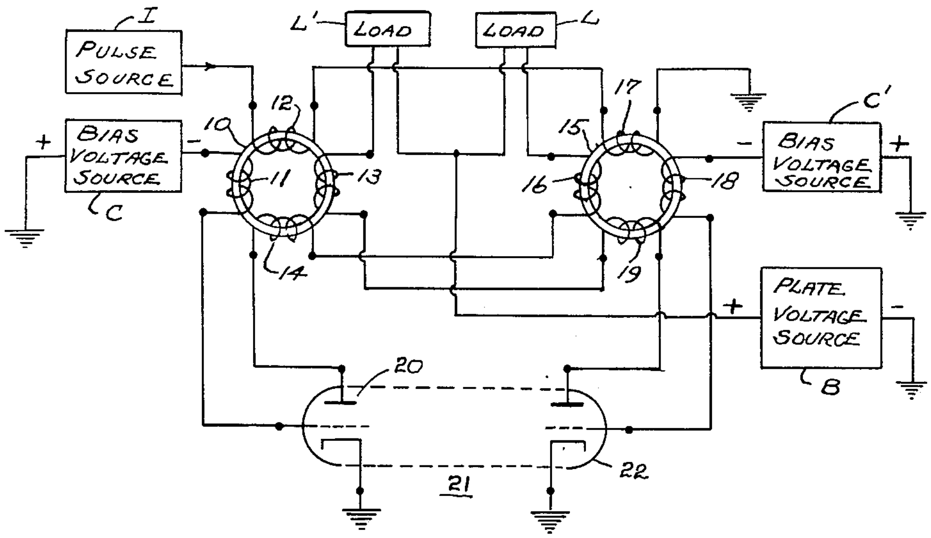
Fig. 1 is a circuit schematic illustrating a bistable pair of bistable blocking oscillator circuits embodying this invention.

Referring now to Fig. 1 of the drawing, the transformer core 10 has thereon the spaced apart windings 11, 12, 13 and 14. The similar core 15 has the corresponding spaced apart windings 16, 17, 18 and 19 thereon.

The section 20 of the dual-triode tube 21 has the control grid connected to one end of the winding 11, the other end of which is connected to the negative terminal of the grid biasing voltage source C. The plate of the tube section 20 is connected through the series connected windings 14 and 16, the loads L and L' and the windings 13 and 19 to the plate of the tube section 22 of the tube 20. The junction point of the loads L and L' is connected to the positive terminal of the plate voltage source B.

The control grid of the tube section 22 is connected through the transformer winding 18 to the negative terminal of the bias voltage source C'.

The cathodes of the tube sections 20 and 22 are connected to ground and through same to the negative terminal of the plate voltage source and to the positive terminals of the bias voltage sources.

The windings 11 and 14 are so connected and wound on the core 10 that they regeneratively couple the grid and plate circuits of the tube section 20. Likewise the windings 18 and 19 are so connected and wound that they regeneratively couple the grid and plate circuits of the tube section 22. The windings 13 and 16 are so connected and wound that the current through them applies opposite magneto-motive forces to their respective cores than the currents through the windings 14 and 19 respectively.

The transformer windings 12 and 17 are connected in series, the input signal from the input source I flowing through them to ground.

In operation, with the transformer core 10 in the active state with respect to a plate current pulse in the winding 14, any means of initiating plate current flow in the tube section 20 will cause positive grid voltage to be induced in the winding 11, and a regenerative action will be started. Thus, this action can be started by applying a small positive input pulse to the input winding 12 or by any other means for firing a blocking oscillator. A flux change will occur and the resulting voltage induced in the grid winding 11 will decrease the negative grid potential. Regenerative action is initiated, and the grid potential, as well as the plate and grid currents, increase rapidly to equilibrium values. The plate current through the plate winding 14 causes the core 10 to switch from its odd state value of maximum residual induction (active state) to the normal state value of maximum saturation induction (inactive state). Then the flux can no longer change, grid voltage is no longer induced in the winding 11, the grid of the tube section 20 will return to the C− potential, and the plate current of the tube section 20 will be cut-off.

Because the change in magnetic induction that occurs during switching has a large value, a comparatively large amount of energy can be delivered to a load with but a relatively small core volume.

The application of a second positive input pulse cannot cause regeneration or fire the tube, for flux change beyond the normal saturation value is not possible. The bistable transformer must be switched back to its odd or active state before the next input pulse can actuate the oscillator. This can be accomplished by a current pulse through the reset winding 13, the winding sense of which is such that the direction of flux change is opposite to that caused by the plate current. Therefore, during the reset operation, the induced potential at the grid will be negative and regeneration cannot occur. In addition, neither grid or plate current can flow, with the result that the bistable transformer is not loaded while being reset. Thus, only enough ampere-turn-microseconds to switch the core are needed for the reset operation.

When two oscillators are connected as illustrated by Fig. 1 of the drawing, with the reset windings 13 and 16 in series with the opposite plate windings 19 and 14 respectively, with the core 15 inactive when the core 10 is active, the core 15 will be switched to the active state when the tube section 20 draws plate current. This occurs when the tube section 20 fires and the core 10 is being driven into the inactive state.

The next input pulse through the windings 12 and 17 will have no effect upon the tube section 20, the grid winding 11 of which is on the now inactive core 10, but will trigger the tube section 22, the grid winding 18 of which is on the now active core 15. The tube section 22 will then fire so that plate current will flow in the reset winding 13 on the core 10, switching it into the active state, the core 15 at this time becoming inactive.

The next input pulse in the input winding 12 will then again fire the tube section 20, this action continuing, the two oscillators firing alternately. The oscillators can deliver pulses at appreciable power levels to their associated loads L and L′ which may be the shift registers referred to in the foregoing and described in said article.

The corresponding windings of the two transformers are identical. The number of turns on each reset winding is selected so that each transformer is reset from the inactive to the active state in less time than the other transformer (the tube of which is firing) requires to switch from its active to its inactive state. This insures reliable operation.

Precautions should be taken to avoid both cores becoming inactive (or active) simultaneously. In normal operation this should not happen. However, if in starting or stopping the oscillator pair, or under unusual conditions it does occur, some form of resetting is required. This may be accomplished by interrupting the input pulses, and by switching one of the cores to the active state as by grounding one plate lead through a suitable resistor or capacitor, or by removing the bias on one grid.

In some applications of magnetic binary elements to digital computing equipment, it is desirable for the second shifting pulse to follow immediately after the first without an additional input pulse. This could be accomplished by combining two conventional blocking oscillators with a monostable multivibrator, but can be accomplished with less equipment and expense utilizing this invention. Another advantage is that no standby plate current is required.

In Fig. 1, the bias voltage source C′ may be so adjusted as to place tube 22 near its firing (cut-off bias) point. When tube 20 is fired by the pulse source I, core 15 is driven to its maximum saturation value. After the firing of tube 20 is complete, the induction of core 15 returns from its maximum saturation value to its maximum residual value, thus generating a pulse across winding 18 of the proper polarity to fire tube section 22. When tube section 22 fires, the coupling of the windings resets core 10 to a state of readiness for the next pulse.

Figure 2:
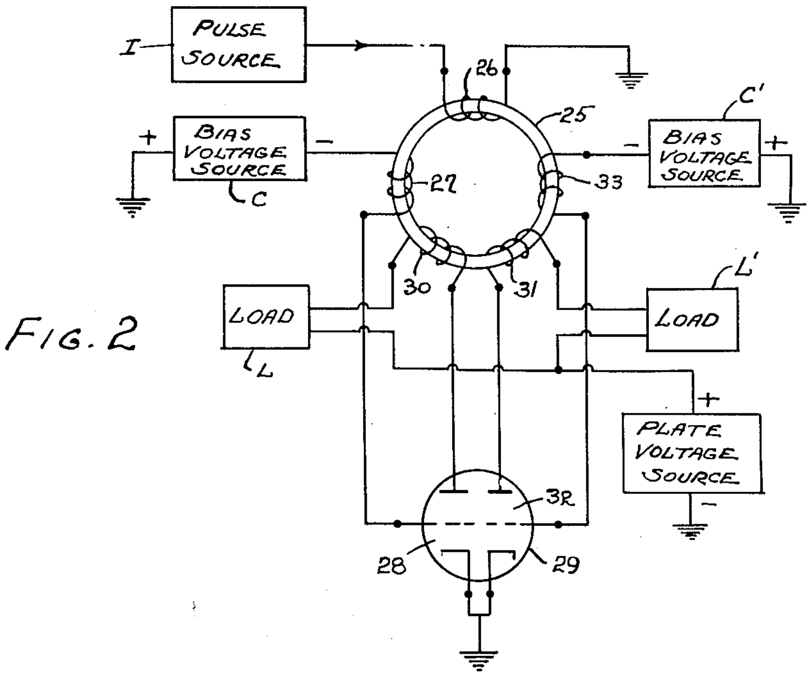
Fig. 2 is a circuit schematic illustrating a monostable pair of bistable blocking oscillator circuits embodying this invention.

In Fig. 2, a single magnetic binary transformer core 25 is used. It has the winding 26 thereon connected at one end to the pulse input source I, and at its other end to ground. It has the grid winding 27 thereon connected at one end to the negative terminal of the bias voltage source C, and its other end connected to the grid of the section 28 of the dual-triode tube 29. It has the plate winding 30 thereon connected at one end to the plate of the tube section 28, and at its other end, through the load L, to the positive terminal of the plate voltage supply source B.

The core also has the plate winding 31 thereon connected at one end to the plate of the section 32 of the tube 29 and at its other end, through the load L′ to the plate voltage source B, and has the grid winding 33 thereon connected at one end to the grid of the tube section 32, and at its other end to the negative terminal of the bias voltage source C′.

The cathodes of the tube 29 are grounded and are connected through ground to the positive terminals of the bias voltage sources and to the negative terminal of the plate voltage source as is conventional.

In the operation of the circuit of Fig. 2, the bias on the grid of the tube section 32 is selected to have a small value, and the bias on the grid of the tube section 28 is selected to bias it well beyond cut-off.

If quiescent plate current is drawn by the oscillator tube section 32, that current will ensure that the binary transformer is in an active state with respect to the oscillator tube section 28, which is in an inactive state with respect to the oscillator tube section 32. If quiescent plate current is not drawn by the oscillator tube section 32, i. e., the C′ bias is just beyond the cut-off point, it may be necessary initially to draw current through the winding 31 momentarily to establish that state of the binary transformer.

The windings 30 and 31 are so connected and wound that the plate currents through them apply opposite magneto-motive forces to the core. The windings 27 and 30 are so connected and wound that they regeneratively couple the grid and plate circuits of the tube section 28, and the windings 31 and 33 are so connected and wound that they regeneratively couple the plate and grid circuits of the tube section 32.

The input winding 26 is connected to the external pulse generator in the correct polarity to trigger the oscillator tube section 28. During the firing period of tube 28 the direction of core saturation is reversed so that it is active with respect to windings 33 and 31. At the end of this firing period, the decay in the plate current of the tube section 28 induces the voltage to trigger the tube section 32. Resetting of the magnetic binary core is thus automatic.

Figures 3, 4, 5:
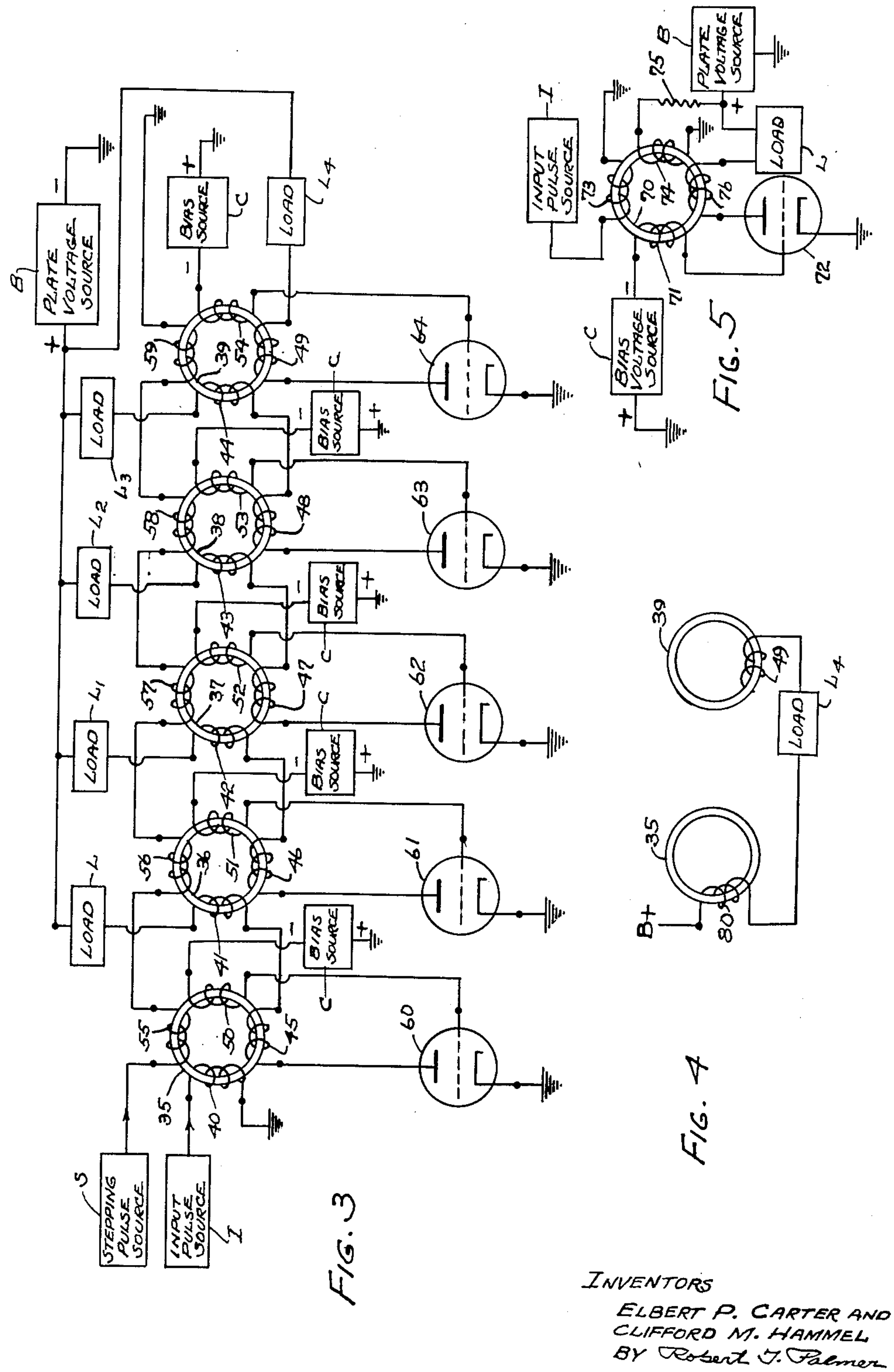
Fig. 3 is a circuit schematic illustrating a stepping pulse generator embodying this invention.
Fig. 4 illustrates a modification of the circuit of Fig. 3.
Fig. 5 is a circuit schematic of a single bistable blocking oscillator circuit embodying this invention.

Fig. 3 of the drawing illustrates another embodiment of this invention in which a number of blocking oscillators are connected in a row to form a combined stepping counter and pulse generator, termed a stepping pulse generator. The magnetic binary transformer cores 35, 36, 37, 38 and 39 have thereon the resetting windings 40, 41, 42, 43 and 44 respectively, the plate windings 45, 46, 47, 48 and 49 respectively, the grid windings 50, 51, 52, 53 and 54 respectively, and the stepping pulse input windings 55, 56, 57, 58 and 59 respectively, the latter being connected in series.

The plate of the tube 60 is connected to the winding 45 which is connected in series with the winding 41 and the load L to the positive terminal of the plate voltage source B. Likewise, the plate of the tube 61 is connected to the winding 46 which is connected in series with the winding 42 and the load $L_1$ to B+. Likewise the plate of the tube 62 is connected to the winding 47 which is connected in series with the winding 43 and the load $L_2$ to B+. Likewise the plate of the tube 63 is connected to the winding 48 which is connected in series with the winding 44 and the load $L_3$ to B+.

The plate of the tube 64 is connected through the winding 49 on the core 39 to B+. The control grid of tube 64 is connected through the winding 54 on the core 39 to C−.

The grids of the tubes 60, 61, 62, 63 and 64 are connected through the windings 50, 51, 52, 53 and 54 respectively to C−, each grid being biased beyond cut-off. The cathodes of the tubes are connected to ground.

The resetting winding 40 is connected at one end to the external, input pulse source I, and at its other end to ground. The other resetting windings 41, 42, 43 and 44 are each connected in series with the plate winding of the preceding tube.

The input windings 55, 56, 57, 58 and 59 are connected in series, in the correct polarity, to the stepping pulse source S, to fire any oscillator which happens to be in the active or reset condition. The source S may be any source synchronized with any desired programming system.

Normally all of the oscillators are in the inactive state, and nothing happens when stepping pulses are received. A pulse applied to the reset winding 40 of the first core 35, sufficient to reset the latter, starts a cycle of operations of the system. The next stepping pulse then triggers the first oscillator tube 60 causing it to fire and to switch the first core to its inactive state by the plate current in the winding 45, and to reset the second core 36 by the plate current in the reset winding 41. The next stepping pulse causes the second oscillator tube 61 to fire and to switch the second core to its inactive state by the plate current in the winding 46, and to reset the third core 37 by the plate current in the reset winding 42. The next stepping pulse causes the third oscillator tube 62 to fire and to switch the third core to its inactive state by the plate current in the winding 47, and to reset the fourth core 38 by the plate current in the reset winding 43. The next stepping pulse causes the fourth oscillator tube 63 to fire and to switch the fourth core to its inactive state by the plate current in the winding 53, and to reset the fifth core 39 by the plate current in the reset winding 44. The next stepping pulse causes the tube 64 to fire and through plate current in the winding 49, makes the core 39 inactive, thus stopping the cycle of operations. Thus, after initiation, this system can deliver pulses successively to a number of different loads, synchronized with a series of stepping pulses. The time between stepping pulses should of course, exceed the firing periods of the oscillators. Odd states may be removed when no longer required by introducing a number of stepping pulses equal to the number of stages.

The plate winding 49 of the last core 39 of Fig. 3, may be, as illustrated by Fig. 4, connected in series with a reset winding 80 of the first core 35, which is in adidtion to the previously described windings thereon, and through the winding 80 to B+, instead of directly to B+, forming a closed ring, in which the active state is passed from one stage around the ring as successive stepping pulses fire the active oscillator. Otherwise the circuit of Fig. 3 is unchanged. More than one such active state could be introduced into either the stepping pulse generator or the ring, as long as the active stages are separated by at least one inactive stage.

Fig. 5 of the drawing illustrates a single blocking oscillator circuit embodying this invention. The magnetic binary core 70 has the grid winding 71 thereon connected at one end to the negative terminal of the bias voltage source C, and at its other end to the grid of the tube 72. The core also has the input winding 73 connected at one end to the input pulse source I and at its other end to ground. The reset winding 74 on the core is connected at one end to ground and at its other end through the resistor 75 to the positive terminal of the plate voltage source B, and through the load L to one end of the plate winding 76 on the core, the other end of which is connected to the plate of the tube 72.

The current through the reset winding 74 applies an opposite magneto-motive force to the core than that applied by the flow of plate current through the plate winding 76.

The tube 72 is biased to cut-off. With the tube non-conducting, the current through the reset winding 74 is sufficient to saturate the core 70 in the direction to make it active with respect to plate current in the winding 76. The resistor 75 limits the current through the reset winding 74 so that it is sufficiently less than the plate current that the latter, when the tube is triggered, can saturate the core in the opposite direction.

The input winding 71 is connected to the pulse generator I in the correct polarity to trigger the tube 72. When the tube fires, its plate current saturates the core making it inactive. It is able to do this since its plate current is greater than the current flow through the winding 74. At the end of this firing period the plate current ceases, and the current through the reset winding resets the core to the active state with respect to the input pulses. Resetting of the core is thus automatic.

Another advantage of this invention is that large flux density changes are provided with very small magneto-motive forces applied to the magnetic binary cores used. Pulses having substantially greater durations than have been supplied by conventional blocking oscillators, can be supplied to loads.

Another advantage of this invention is that due to the large flux density change in the type of core material used, relatively small core cross-section can be used, this feature being of great advantage where long pulse durations at relatively high power levels are required, where the weight of the transformers becomes an important factor.

While electron tubes have been described as the amplifiers used with the magnetic binary transformers, other amplifiers, such for example, as "Transistors" could be used.

Figs. 1–5 of the drawings are intended as circuit schematics only, and are not intended to illustrate the constructions of the transformer cores or the physical arrangements of the windings thereon. The proper polarities at the windings and the directions in which they should be wound will be apparent to those skilled in the art to which the invention pertains.

While embodiments of this invention have been described for the purpose of illustration, it should be understood that the invention is not limited to the exact apparatus and arrangement of apparatus illustrated, since modifications thereof may be suggested by those skilled in the art without departure from the essence of the invention.

What we claim as our invention is:

1. A pulse generator comprising a magnetic binary transformer core, an electronic amplifier having an anode, means for biasing said amplifier to cut-off, a first winding on said core connected to said anode, an anode voltage source connected to said winding, means for causing said amplifier to conduct and to supply anode current through said winding for saturating said core in one direction and then to cease to conduct, a second winding on said core, and means for flowing current through said second winding for saturating said core in the opposite direction.

2. A pulse generator as claimed in claim 1 in which a load is connected in series with the first winding.

3. A pulse generator as claimed in claim 1 in which the means for causing the amplifier to conduct includes an input winding on the core.

4. A pulse generator as claimed in claim 2 in which the means for causing the amplifier to conduct includes an input winding on the core.

5. A pulse generator comprising a magnetic binary transformer core, an electronic amplifier having a control electrode and an anode, means for biasing said amplifier to cut-off, a first winding on said core connected to said control electrode, a second winding on said core connected to said anode, an anode voltage source connected to said second winding, means including said first winding for applying a trigger pulse to said control electrode for causing said amplifier to conduct and to supply anode current through said second winding for saturating said core in one direction, a third winding on said core, and means for flowing current through said third winding for saturating said core in the opposite direction.

6. A pulse generator as claimed in claim 5 in which a load is connected in series with the second winding.

7. A pulse generator as claimed in claim 5 in which the first and second windings are regeneratively coupled.

8. A pulse generator as claimed in claim 6 in which the first and second windings are regeneratively coupled.

9. A pulse generating circuit comprising a magnetic binary core, a pair of electronic amplifier elements, each having a control electrode and an anode, means for biasing one of said elements to cut-off and the other of said elements above cut-off, an input winding on said core, a pair of windings on said core connected to said control electrodes, a pair of windings on said core connected to said anodes, and an anode voltage source connected to said last mentioned windings, said last mentioned windings being so connected that the anode currents therethrough apply opposite magneto-motive forces to the core, one of said last mentioned windings being regeneratively coupled to the winding connected to the control electrode of its respective element, and the other of said last mentioned windings being regeneratively coupled to the winding connected to the control electrode of its respective element.

10. A pulse generating circuit as claimed in claim 9 in which loads are connected between the anodes and the anode voltage source.

11. A pulse generating circuit as claimed in claim 9 in which the means for biasing the elements are connected to the control electrodes through the said windings connected thereto.

12. A pulse generating circuit as claimed in claim 11 in which loads are connected in series with the windings connected to the anodes.

13. A pulse generating circuit comprising a pair of magnetic binary cores, an input winding on each of said cores for connection to a pulse source, a pair of electronic amplifier elements each having a control electrode and an anode, means biasing said elements to cut-off, a third winding on one of said cores connected to the control electrode of one of said elements, a fourth winding on the other of said cores connected to the control electrode of the other of said elements, a fifth winding on said one of said cores connected to the anode of said one of said elements, a sixth winding on said other of said cores connected to said anode of said other of said elements, a seventh winding on said other core connected to said fifth winding, an eighth winding on said one core, means connecting said fifth, seventh, eighth and sixth windings in series, and an anode voltage source connected to the junction point of said seventh and eighth windings.

14. A pulse generating circuit as claimed in claim 13 in which loads are connected in series with the anodes and the seventh and eighth windings.

15. A pulse generating circuit as claimed in claim 13 in which the means for biasing the elements are connected to the control electrodes through the windings connected thereto.

16. A pulse generating circuit comprising a plurality of magnetic binary cores, an electronic amplifier element having a control electrode and an anode for each core, said cores having series connected stepping pulse windings thereon, having windings thereon connected to the control electrodes of their respective elements, having anode windings thereon connected to the anodes of their respective elements, and having reset windings thereon, the reset winding on each core except the first, being connected to the preceding anode winding in the order of the series connection of their associated stepping pulse windings, said first winding having connections for receiving initiating pulses, said elements being biased to cut-off, and an anode voltage source connected to said anode windings.

17. A pulse generating circuit as claimed in claim 16 in which loads are connected in series with the anode windings.

18. A pulse generating circuit as claimed in claim 16 in which an additional reset winding is provided on the first core and in which the anode winding on the last of the cores in the order of the series connection of their associated stepping pulse windings is connected in series with the said additional reset winding.

19. A pulse generating circuit as claimed in claim 18 in which loads are connected in series with the anode windings and their respective anodes.

ELBERT P. CARTER.
CLIFFORD M. HAMMEL.

No references cited.